(12) United States Patent
Yu et al.

(10) Patent No.: US 12,596,103 B2
(45) Date of Patent: Apr. 7, 2026

(54) FIXTURING MECHANISM WITH LOAD SENSORS FOR ACOUSTIC TESTING OF BATTERY SAMPLES

(71) Applicant: Liminal Insights, Inc., Emeryville, CA (US)

(72) Inventors: Dennis Yu, Alameda, CA (US); Shaurjo Biswas, El Cerrito, CA (US); Omar Aleman, Emeryville, CA (US); Ashlyn Leona D'Orazio, Berkeley, CA (US); Kelsea Keenan, San Francisco, CA (US); Jason Yue Yu, Castro Valley, CA (US); Yu-Shi Fong, Emeryville, CA (US); Andrew G. Hsieh, Emeryville, CA (US)

(73) Assignee: LIMINAL INSIGHTS, INC., Emeryville, CA (US)

( * ) Notice: Subject to any disclaimer, the term of this patent is extended or adjusted under 35 U.S.C. 154(b) by 300 days.

(21) Appl. No.: 18/205,257

(22) Filed: Jun. 2, 2023

(65) Prior Publication Data

US 2023/0393097 A1 Dec. 7, 2023

Related U.S. Application Data

(60) Provisional application No. 63/365,757, filed on Jun. 2, 2022.

(51) Int. Cl.
*G01N 29/04* (2006.01)
*G01N 29/22* (2006.01)

(52) U.S. Cl.
CPC ........... *G01N 29/04* (2013.01); *G01N 29/223* (2013.01); *G01N 2291/023* (2013.01)

(58) Field of Classification Search
None
See application file for complete search history.

(56) References Cited

U.S. PATENT DOCUMENTS

| | | | |
|---|---|---|---|
| 2016/0223498 A1* | 8/2016 | Steingart | G01N 29/46 |
| 2018/0123189 A1 | 5/2018 | Biswas et al. | |
| 2020/0251788 A1 | 8/2020 | Sood et al. | |
| 2020/0284766 A1 | 9/2020 | Shen et al. | |
| 2023/0221285 A1* | 7/2023 | Dou | G01N 29/262 |
| | | | 429/91 |

OTHER PUBLICATIONS

International Search Report, dated Sep. 5, 2023, Application # PCT/US2023/024318.

* cited by examiner

*Primary Examiner* — Suman K Nath
(74) *Attorney, Agent, or Firm* — Polsinelli PC

(57) ABSTRACT

One or more aspects of the present disclosure are directed to fixturing mechanisms for placement of battery cells inside an ultrasonic testing system. The disclosed fixturing mechanisms enable accurate and predictable loading, placement, and unloading of battery cells inside ultrasonic testing systems allowing all faces of battery cells of different types (e.g., pouch cells, prismatic cells, cylindrical cells, etc.) to have sufficient exposure to transmission and reception of acoustic signals. This fixturing mechanism furthers the goal of providing a robustly designed ultrasonic test system and producing accurate inspection results for batteries.

20 Claims, 14 Drawing Sheets

Tx = transmit (pulse in)
Rx = receive (signal out)

702

706

708

710

704

716    718

708

710

706

714     712

SELECT A BATTERY CELL FROM A
PRODUCTION LINE FOR ACOUSTIC
INSPECTION — 802

OPEN FIXTURE FOR PLACING
SELECTED BATTERY CELL THEREIN FOR
ACOUSTIC INSPECTION — 804

CLOSE FIXTURE AFTER PLACEMENT OF
BATTERY CELL THEREIN — 806

INSERT CLOSED FIXTURE INSIDE
ULTRASONIC TEST SYSTEM FOR
ACOUSTIC INSPECTION OF THE
BATTERY CELL — 808

FIXTURING MECHANISM WITH LOAD SENSORS FOR ACOUSTIC TESTING OF BATTERY SAMPLES

CROSS-REFERENCE TO RELATED APPLICATIONS

This application claims priority to U.S. Provisional Application 63/365,757 filed on Jun. 2, 2022, the entire content of which is incorporated herein by reference.

FIELD OF DISCLOSURE

Disclosed aspects are directed to apparatus and systems for fixturing and handling batteries for acoustic inspection designed in such a way that the acoustic source and sensors cover the entire or part of the battery cells surface area and the fixturing can be scaled to be implemented in high throughput production environments.

BACKGROUND

Demand for production of battery cells is on the rise owing to an increase in their use across various industries such as consumer electronics, automotive, clean energy, etc. Efficient and fast battery diagnostics methods are important for increasing quality, lifetime, and manufacturing process efficiency for batteries. In the case of manufacturing and production, reducing costs (e.g., price per kilowatt-hour (kWh)) is an important goal. Production costs and quality can be reduced by optimizing existing processes and/or introducing new technologies. For example, technological advances in the area of improved monitoring, manufacturing, and diagnostics can lead to cost efficiencies by shortening production process times (thus also reducing energy consumption during production), reducing waste due to damaged cells and cell parts, improving quality, etc.

BRIEF SUMMARY

Aspects of the present disclosure are directed to fixturing mechanisms for placing battery cells in a battery testing apparatus for ultrasonic inspect of said battery cells.

In one aspect, an apparatus includes a first piece coupled to a second piece, wherein the first piece is configured to open relative to the second piece for placing a battery cell between the first piece and the second piece for acoustic inspection; and an opening formed in between the first piece and the second piece that provides exposure of both sides of the battery cell for the acoustic inspection. after closing the first piece.

In another aspect, the battery cell is a pouch cell.

In another aspect, the apparatus is inserted into an ultrasonic test system for the acoustic inspection.

In another aspect, the apparatus is attached to a moving mechanism for placement within the ultrasonic test system.

In another aspect, the first piece and the second piece are coupled together using at least one aligning pin and at least one magnet-based coupling mechanism.

In one aspect, an apparatus includes a first side, a second side, and a bottom portion connecting the first side and the second side, wherein a U-shaped opening is formed between the first side, the bottom portion and the second side for placement of a battery cell therein for acoustic inspection.

In another aspect, the battery cell is a Prismatic Battery Cell.

In another aspect, the first side and the second side are movable to accommodate battery cells of different lengths to be placed within the U-shaped opening.

In another aspect, the first side and the second side are controlled to move horizontally for accommodating the battery cells of different lengths.

In another aspect, the first side and the second side are independently controlled via separate actuators.

In another aspect, the first side is spring-loaded and the second side is fixed.

In another aspect, the first side is configured to move horizontally to adjust side of the U-shaped opening for receiving the battery cell therein.

In another aspect, each of the first side and the second side include one or more rollers configured to facilitate sliding the battery cell to fit within the U-shaped opening.

In one aspect, an apparatus includes a first structure, and a second structure opposite the first structure, wherein a battery cell is placed in between the first structure and the second structure to be rotated by the first structure and the second structure for acoustic inspection.

In another aspect, the battery cell is a cylindrical battery cell.

In another aspect, each of the first structure and the second structure is formed of a single cylindrical roller configured to spin for rotating the battery cell for the acoustic inspection.

In another aspect, each of the first structure and the second structure comprises at least two rollers.

In another aspect, one of the at least two rollers in one of the first structure or the second structure is controlled via an actuator for rotating the battery cell.

In another aspect, remaining ones of the at least two rollers in the first structure and the second structure are configured to rotate as a result of the battery cell rotating by the one of the at least two rollers.

In another aspect, the actuator is a pneumatic actuator.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
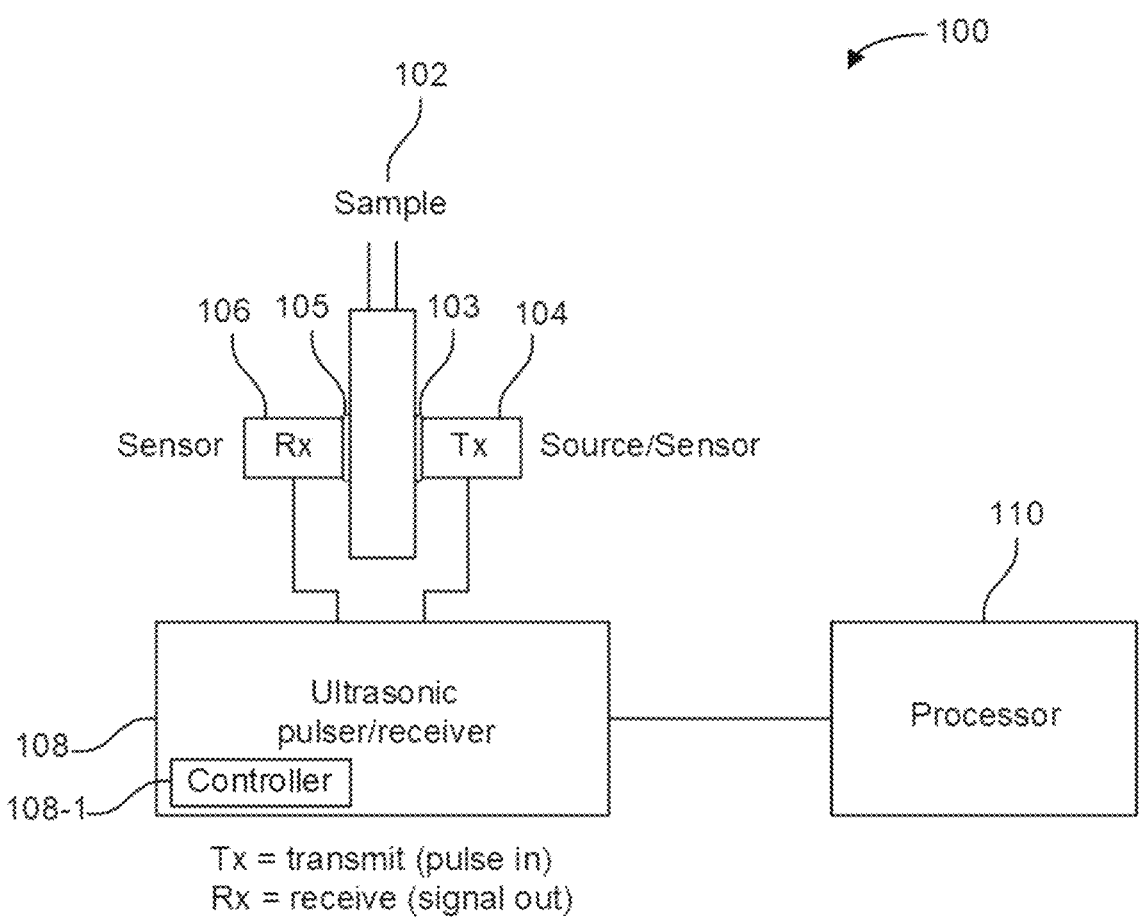
FIG. 1 illustrates an example system for analyzing a sample using acoustic signal-based analysis according to some aspects of the present disclosure.

Certain aspects and embodiments of this disclosure are provided in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Demand for production of battery cells is on the rise owing to an increase in their use across various industries such as consumer electronics, automotive, clean energy, etc. A non-limiting application of battery cells is the electrical vehicle (EV) industry. According to various market research, the industry needs massive buildouts to meet EV demand by 2030 (around 15 times the current capacity). The cost of battery cell production should decrease by around 40% according to some estimates. Furthermore, as evidence thereof have already been seen, reliability of EV batteries is critical as human and financial remedies of EV recalls due to faulty batteries are immense (already to the tune of more than $3B in 2020-2021).

Battery manufacturing processes are not without challenges. For example, the cost of raw materials is on the rise and issues during manufacturing can lead to poor quality battery cells and hence unreliable battery cells being incorporated into and utilized in their respective applications such as in EVs, which can ultimately lead to the costly failures mentioned above.

For instance, battery defects that can lead to poor battery cell performance, a catastrophic battery (and/or device) failure, etc. Such defects can arise during the manufacturing process or during regular operation of a battery after the battery is placed in a device. Such defects are difficult to detect because they are generally deep within the battery cell and hidden from non-invasive imaging methods or are not substantial enough to be detected through electrical inspection methods until the defect has caused substantial damage/ degradation to the battery.

In some examples, manufacturing defects can include, but are not limited to, folds, wrinkles, or holes in traditional polymer-based separator materials, cracks or fractures in solid-state ceramic based separators, dry spots within the cell due to poor electrolyte saturation, electrode holes, folds, delamination, or layer misalignment, foreign object debris, burrs, metallic particle inclusions, tab defects including tears, folds, and poor quality welds, electrode misalignment, electrode holes and folds, electrode material delamination, among others.

Operational defects can include, but are not limited to, the plating of lithium metal (e.g., dendritic growth or otherwise) on the anode material, dry spots within the cell due to electrolyte degradation, the evolution of gasses resulting from electrolyte or other chemical decomposition, among others. All of these defects can cause micro-shorts in the battery that, if allowed to propagate, can lead to early cell death, rapid loss of capacity, and/or catastrophic failure.

Currently available methods for studying defective batteries include x-ray or CT inspection of cell and tearing down a battery after it has been flagged as underperforming, a safety hazard, or a failure in the field.

It is difficult to study defective batteries because of the challenges associated with properly attributing the impact and causality of a specific defective component towards the failure of a battery. Furthermore, the availability of defective batteries is limited because of the extensive resources and safety considerations surrounding their production and transport. Additionally, intentional production of batteries with known and clearly defined defects is difficult to control from a process standpoint. Defects in batteries need to be studied to improve battery development and manufacturing processes, which cannot be done without adequate samples that safely and effectively model these defects.

When conducting ultrasound-based inspection tests on batteries, the wide parameter space on the test apparatus and the sample form factor can lead to challenges involving non-recurring engineering and design tasks. For example, a subset of ultrasonic test settings may be optimized to see a folded separator in a Lithium-ion battery pouch cell, but may not be able to detect electrode inclusions in the same cell. Conversely, observing a separator fold may require different ultrasonic settings in prismatic or hard can cells versus pouch cells. The wide parameter space within ultrasound as it pertains to testing batteries can require that the test system be designed so that different transducer types can be accommodated, different test methodologies can be executed electronically, and/or that the test bed can accommodate most of the common battery form factors.

Ultrasonic tests are also highly influenced by external factors. Even in the most basic tests, results can vary drastically with fluctuations in mechanical alignment, contact force, external temperature, pressure and environment, as well as within the ultrasonic coupling used to transfer the ultrasonic pulse from the transducer to the test sample. A robustly designed ultrasonic test system as described herein can factor all of these challenges in order to produce accurate and reproducible results.

The systems and techniques described herein for detecting defects in batteries can address the foregoing challenges (as well as other challenges). More specifically, the present disclosure is directed to fixturing mechanisms for placement of battery cells inside an ultrasonic testing system. The disclosed fixturing mechanisms enable accurate and predictable loading, placement, and unloading of battery cells inside ultrasonic testing systems allowing all faces of battery cells of different types (e.g., pouch cells, prismatic cells, and cylindrical cells) to have sufficient exposure to transmission and reception of acoustic signals. This fixturing mechanism furthers the goal of providing a robustly designed ultrasonic test system and producing accurate inspection results for batteries.

Figure 2:
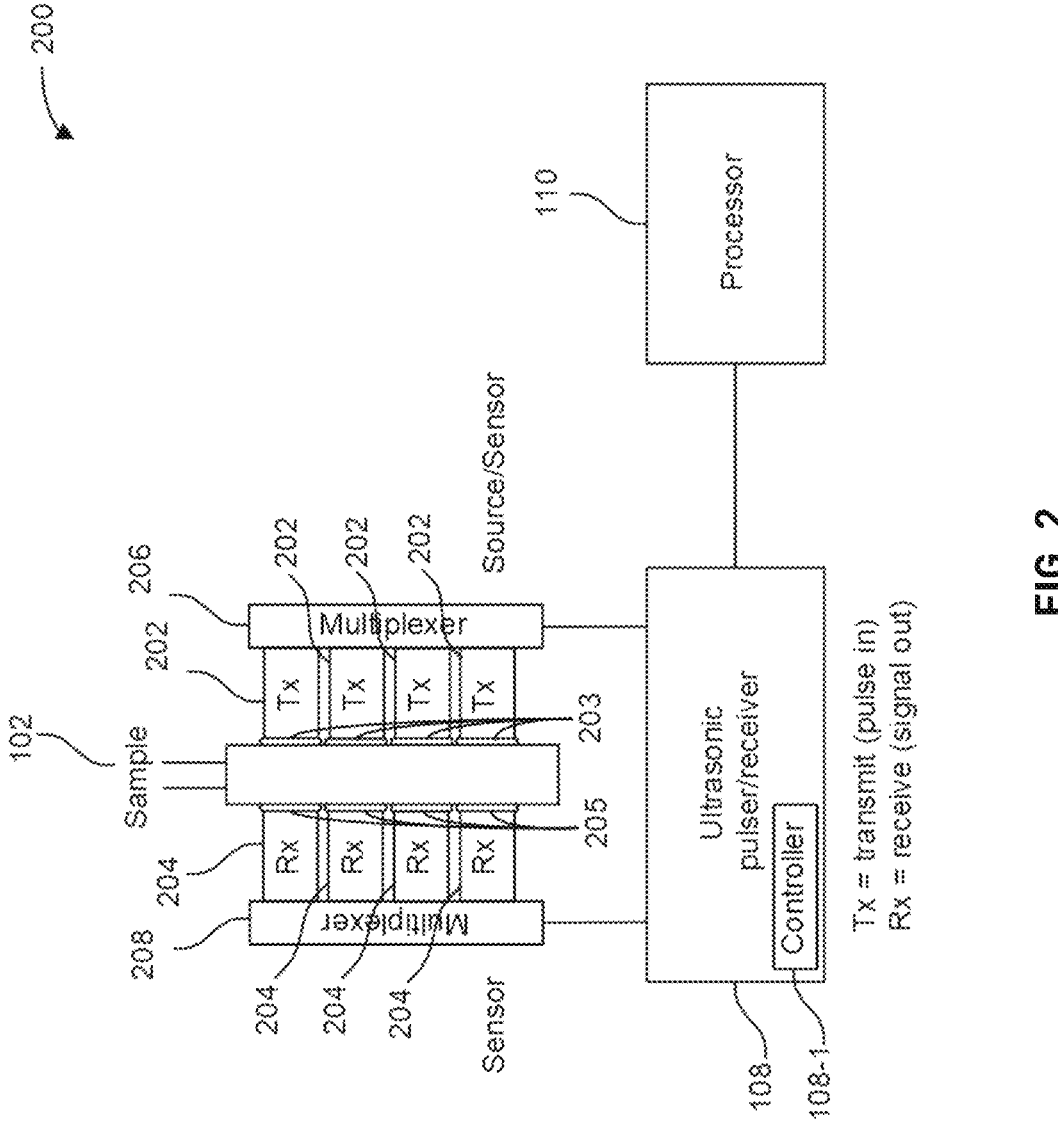
FIG. 2 illustrates another example system for analyzing a sample using acoustic signal-based analysis according to some aspects of the present disclosure.

Description of exemplary systems for performing non-invasive and acoustic measurement of battery cells is provided with reference to FIGS. 1 and 2. The disclosure then provides example embodiments of a fixturing mechanism for placing Prismatic Battery Cells inside an ultrasonic test system with reference to FIGS. 3A-D. Example fixturing mechanism for placing pouch cells inside an ultrasonic test system will be described with reference to FIGS. 4A-C. Example fixturing mechanism for placing cylindrical cells in an ultrasonic test system will be described with reference to FIGS. 5-7. An example method of placing battery cells inside a fixturing mechanism will be described with reference to FIG. 8. The disclosure concludes with a description of an example device and system architecture with reference to FIG. 9.

FIG. 1 illustrates an example system for analyzing a sample using acoustic signal-based analysis according to some aspects of the present disclosure. System 100 may include sample 102. Sample 102 can include a battery cell or component thereof in any stage of production or manufacture of the battery cell or the individual components. In some examples, sample 102 can include a battery cell, electrolytes in various stages of wetting/distribution through a battery cell, one or more electrodes of the battery cell, thin films, separators, coated sheets, current collectors, electrode slurries, or materials for forming any of the above components during any stage of their fabrication. System 100 can include a transmitting transducer Tx 104 or other means for sending excitation sound signals into the battery cell (e.g., for transmitting a pulse or pulses of ultrasonic or other acoustic waves, vibrations, resonance measurements, etc., through the battery cell). System 100 can further include a receiving transducer Rx 106 or other means for receiving/sensing the sound signals, which can receive response signals generated from signals transmitted by transmitting transducer Tx 104. Any type of known or to be developed transducer for transmitting and receiving acoustic signals may be used as transmitting transducer Tx 104. Transmitted signals from transmitting transducer Tx 104, from one side of sample 102 on which transmitting transducer Tx 104 is located, may include input excitation signals. Reflected signals, e.g., from another side of sample 102, may include echo signals. It is understood that references to response signals may include both the input excitation signals and the echo signals. Further, transmitting transducer Tx 104 may also be configured to receive response signals, and similarly, receiving transducer Rx 106 may also be configured to transmit acoustic signals. Any type of known or to be developed transducer for transmitting and receiving acoustic signals may be used as receiving transducer Rx 106. Therefore, even though separately illustrated as Tx and Rx, the functionalities of each of transmitting transducer Tx 104 and receiving transducer Rx 106 may be for both sending and receiving acoustic signals. In various alternatives, even if not specifically illustrated, one or more Tx transducers and one or more Rx transducers can be placed on the same side or wall of sample 102, or on different (e.g., opposite) sides. Throughout this disclosure, reference may be made to a transducer pair (a transmitting transducer and a receiving transducer). Transmitting transducer Tx 104 and receiving transducer Rx 106 may form a pair of transducers.

Acoustic pulser/receiver 108 can be coupled to transmitting transducer Tx 104 and receiving transducer Rx 106 for controlling the transmission of acoustic signals (e.g., ultrasound signals) and receiving response signals. Acoustic pulser/receiver 108 may include a controller 108-1 for adjusting the amplitude, frequency, and/or other signal features of the transmitted signals. Acoustic pulser/receiver 108 may also receive the signals from receiving transducer Rx 106. In some examples, acoustic pulser/receiver 108 may be configured as a combined unit, while in some examples, an acoustic pulser for transmitting excitation signals through transmitting transducer Tx 104 can be a separate unit in communication with a receiver for receiving signals from receiving transducer Rx 106. Processor 110 in communication with acoustic pulser/receiver 108 may be configured to store and analyze the response signal waveforms according to this disclosure. Although representatively shown as a single processor, processor 110 can include one or more processors, including remote processors, cloud computing infrastructure, etc.

In some examples, various acoustic couplants such as couplants 103 and 105 can be used (e.g., solid, liquid, or combinations thereof) for making or enhancing contact between transmitting transducer Tx 104, receiving transducer Rx 106, and sample 102. Furthermore, various attachment or fixturing mechanisms (e.g., pneumatic, compression, screws, springs etc.) can also be used for establishing or enhancing the contact between transmitting transducer Tx 104, receiving transducer Rx 106, and sample 102.

Although not explicitly shown in FIG. 1, more than one transmitting transducer Tx and/or more than one receiving transducer Rx can be placed in one or more spatial locations across sample 102. This allows studying a spatial variation of acoustic signal features across sample 102. A multiplexer can be configured in communication with the acoustic pulser/receiver 108 for separating and channeling the excitation signals to be transmitted and the response signals received. This will be further described below with reference to FIG. 2.

FIG. 2 illustrates another example system for analyzing a sample using acoustic signal-based analysis according to some aspects of the present disclosure. In comparison with FIG. 1, system 200 of FIG. 2 illustrates a system in which multiple pairs of transmitting and receiving transducers are used for transmitting signals through a sample under testing (e.g., a battery cell) and performing acoustic signal-based analysis of the sample.

System 200 includes several transmitting transducers Tx 202 (each of which may be the same as transmitting transducer Tx 104 of FIG. 1). While an array of four examples transmitting transducers Tx 202 are shown in FIG. 2, the disclosure is not limited to four. Any number of transducers may be used (e.g., any number of transmitting transducers Tx ranging from 1 to 10, 15, 20, etc.).

Similarly, system 200 includes a number of receiving transducers Rx 204 (each of which may be the same as receiving transducer Rx 106 of FIG. 1). Receiving transducers Rx 204 may also be referred to as receiving sensors 204. While an array of four examples receiving transducers Rx 204 are shown in FIG. 2, the disclosure is not limited to four. Any number of transducers may be used (e.g., any number of receiving transducers Rx ranging from 1 to 10, 15, 20, etc.). Any given transmitting transducer Tx 202 and receiving transducers Rx 204 may form a transducer pair (FIG. 2 illustrates four transducer pairs). FIG. 2 also illustrates a multiplexer 206 coupled to the array of four transmitting transducers Tx 202 and a multiplexer 208 coupled to the array of four receiving transducers Rx 204. As described above, each one of multiplexers 206 and 208 may be configured to be in communication with the acoustic pulser/receiver 108 for separating and channeling the excitation signals to be transmitted and the response signals received, respectively. In some examples, various acoustic couplants such as couplants 203 and 205 can be used (e.g., solid, liquid, or combinations thereof) for making or enhancing contact between transmitting transducers Tx 202, receiving transducers Rx 204, and sample 102. Furthermore, various attachment or fixturing mechanisms (e.g., pneumatic, compression, screws, etc.) can also be used for establishing or enhancing the contact between transmitting transducers Tx 202, receiving transducers Rx 204, and sample 102. In another example, one or more pairs of transmitting transducer Tx and receiving transducer Rx can be translated on the surface of the sample/battery cell to collect acoustic data from various positions on the sample surface. The spatial resolution of the acoustic data collected can be controlled by moving the transducer pair(s) with certain pitch to get higher spatial coverage of the battery cell sample area.

Spacing between transmitting transducers Tx 202 and receiving transducers Rx 204 may be uniform and the same. System 200 also includes additional elements such as sample 102, ultrasonic pulser/receiver 108 (controller 108-1), processors 110, each of which may be the same as the corresponding counterpart described above with reference to FIG. 1 and hence will not be described further for sake of brevity.

Example systems 100 and 200 may have any shape or form, may be standalone systems, may be portable or stationary, etc. Example systems 100 and 200 may also be referred to as ultrasonic test systems.

Ultrasonic battery inspection using a through transmission transducer setup requires access on two sides of a prismatic or pouch cell and around the entire circumference of a cylindrical cell. In order to allow for this inspection a battery Fixture is proposed to allow for the necessary cell face contact for the inspection.

Constraints to be observed for such battery Fixture include the following. First, the sample is to be accessible on two sides of a prismatic or pouch cell and around the entire circumference of a cylindrical cell. Second, the sample is to be accurately and repeatably placed in the Fixture. This way the ultrasonic measurement is repeatable both when scanning a sample multiple times and from sample to sample. Third, the loading and unloading of the sample must be done without the need for any tools. In instances where there is a human operator, it should be easy for the operator to test a batch of samples on the system. If a machine is loading the sample, it is not realistic to have a tool required for loading and unloading the cell. Fourth, there is to be a feedback system in place to indicate if the cell has been properly loaded. This acts as a safety and reliability check for the system software. With this feedback system in place, the ultrasonic system cannot take a scan without a sample. Fifth, in order to maximize the scan area of the cell, the Fixture is to hold onto as little of the cell face as possible. Sixth, the sample cannot be damaged by the fixturing method.

With example systems used for acoustic signal analysis of batteries described with reference to FIGS. 1 and 2, the disclosure now turns to example fixturing mechanism for placement of battery cells of different types in an ultrasound test systems such as example systems 100 and 200 of FIGS. 1 and 2, to address challenges and constraints described above.

Figure 3A:
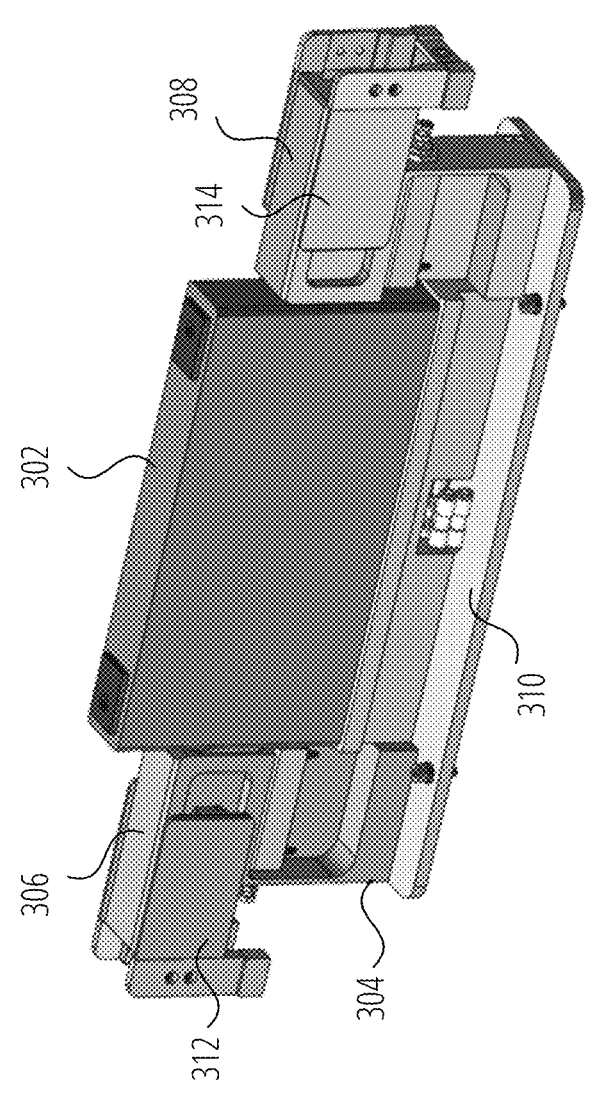
FIG. 3A illustrates an example fixturing mechanism, in an open position, for placing a Prismatic Battery Cell in an ultrasonic test system according to some aspects of the present disclosure.

FIG. 3A illustrates an example fixturing mechanism, in an open position, for placing a Prismatic Battery Cell in an ultrasonic test system according to some aspects of the present disclosure. Prismatic battery cell 302 may be placed inside an opening (a U-shaped opening) of fixture 304. Opening of fixture 304 may be an L-shaped opening between side 306, side 308, and bottom portion 310. While not shown in FIG. 3A, a mechanical arm (that may be electronically and automatically driven) may place prismatic battery cell 302 in the opening of fixture 304. Alternatively, prismatic battery cell 302 may be manually placed in the opening of fixture 304.

Once prismatic battery cell 302 is placed inside fixture 304, prismatic battery cell 302 may be secured inside the opening of Fixture 304 for acoustic inspection using a locking mechanism. Such locking mechanism may be formed of movable arm 312 and movable arm 314. In FIG. 3A, movable arm 312 and movable arm 314 are shown in open position. Movable arm 312 and movable arm 314 may be driven via any known or to be developed mechanism. For example, movable arm 312 and movable arm 314 may be pneumatically driven via any know or to be developed actuator. In some examples, both movable arm 312 and movable arm 314 are driven (controlled) using a single actuator, hence ensure synchronized movement of movable arm 312 and movable arm 314. In another example, each of movable arm 312 and movable arm 314 may be driven (controlled) using separate actuators. The separate actuators may be calibrated to synchronously move movable arm 312 and movable arm 314.

Figure 3B:
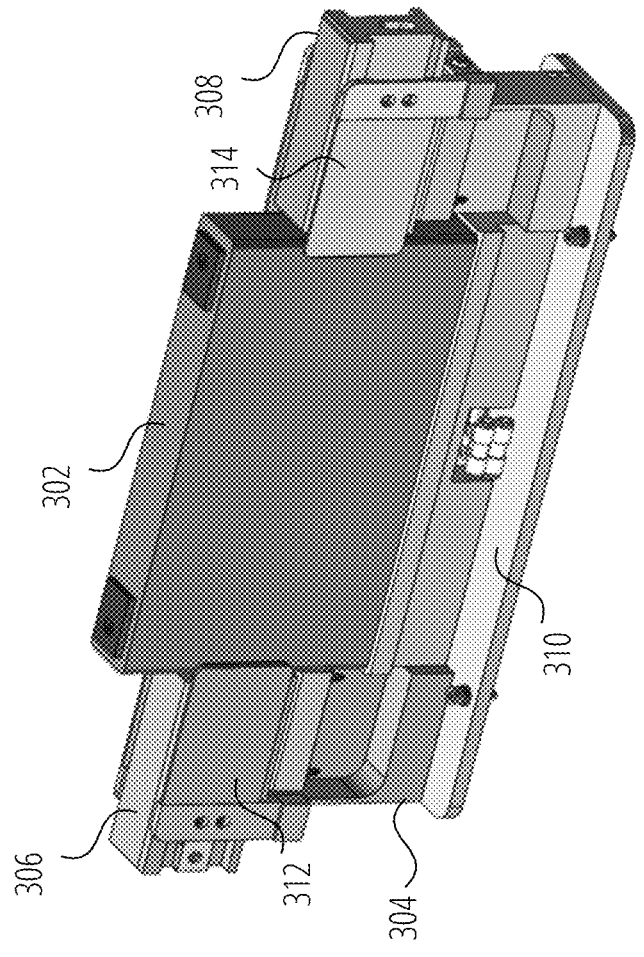
FIG. 3B illustrates an example fixturing mechanism, in a locked position, for placing a Prismatic Battery Cell in an ultrasonic test system according to some aspects of the present disclosure.

FIG. 3B illustrates an example fixturing mechanism, in a locked position, for placing a Prismatic Battery Cell in an ultrasonic test system according to some aspects of the present disclosure. FIG. 3B illustrates Fixture 304 with prismatic battery cell 302 placed inside opening of fixture 304 and locked (closed). Compared to FIG. 3A, movable arm 312 and movable arm 314 are in a locked position securing prismatic battery cell 302 within fixture 304 for acoustic inspection.

Fixture 304 of FIGS. 3A-B may be made of any known or to be developed material. Shape and size of Fixture 304 as well as operation thereof, are not limited to that shown in FIGS. 3A-B and may include any other alternative design, shape and manner of operation. Furthermore, Fixture 304 may be affixed to ultrasonic test system and/or housing within which ultrasonic test system (e.g., system 100 and/or 200) sit using any known or to be developed technique such as using screws, bolts, etc.

Figure 3C:
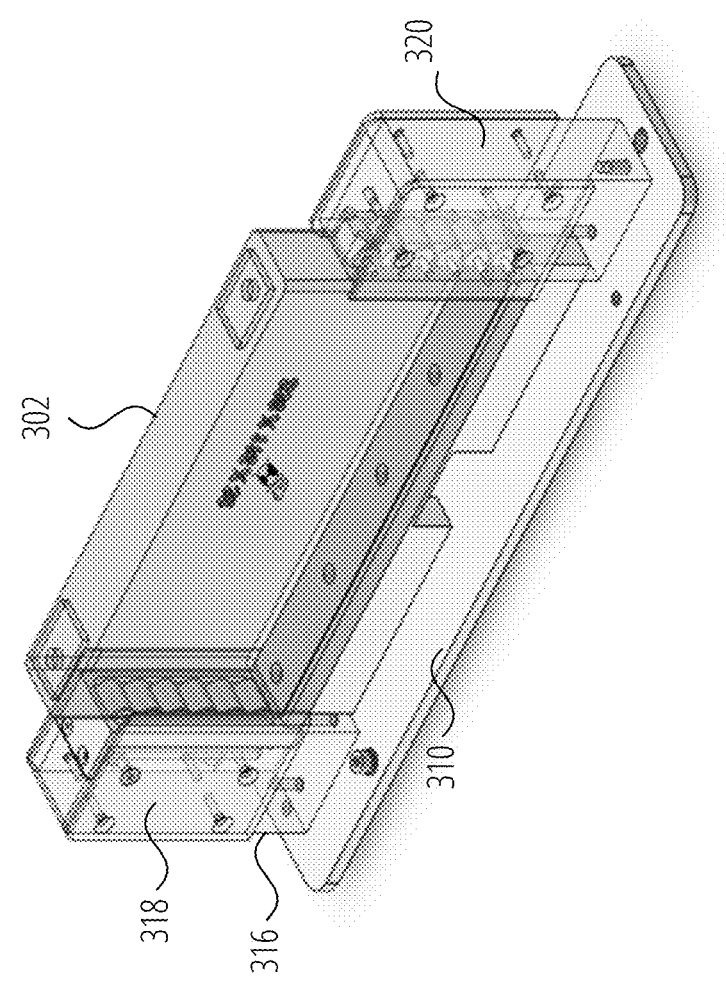
FIG. 3C illustrates another example fixturing mechanism for placing a Prismatic Battery Cell in an ultrasonic test system according to some aspects of the present disclosure.

FIG. 3C illustrates another example fixturing mechanism for placing a Prismatic Battery Cell in an ultrasonic test system according to some aspects of the present disclosure. Fixture 316 of FIG. 3C has a different design compared to fixture 304 of FIGS. 3A-B in that compared to movable arm 312 and movable arm 314, arm 318 and arm 320 are not movable in horizontal direction but rather arm 318 includes a number of spring-loaded rollers that can move horizontally to adjust for variations in length of prismatic battery cell 302. Arm 320 includes a number of fixed (in position) rollers. Rollers inside arm 318 and arm 320 may be placed to be in contact with sides of prismatic battery cell 302 in order to facilitate placement and sliding of prismatic battery cell 302 to be placed inside the opening of Fixture 316. Arm 318 and arm 320 and associated rollers and springs used therein are more fully described below with reference to FIG. 3D.

Figure 3D:
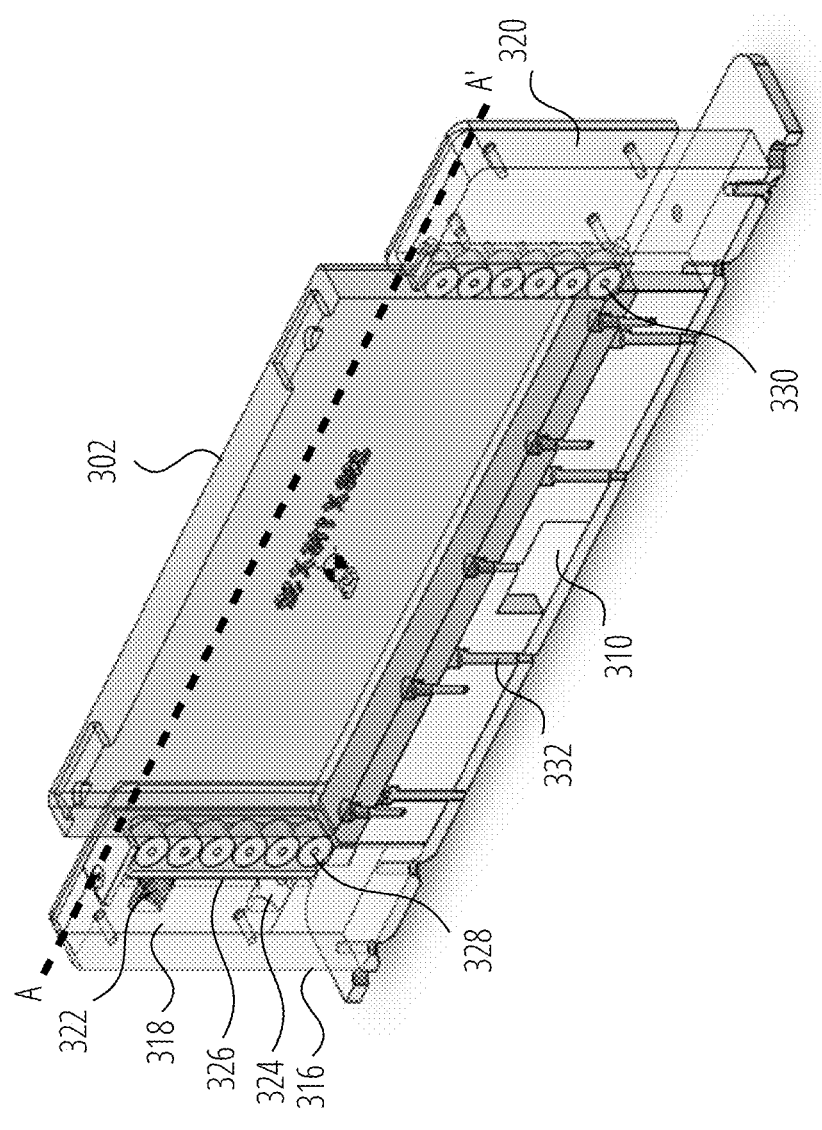
FIG. 3D illustrates a cross sectional view of example fixturing mechanism of FIG. 3C according to some aspects of the present disclosure.

FIG. 3D illustrates a cross sectional view of example fixturing mechanism of FIG. 3C according to some aspects of the present disclosure. FIG. 3D is a cross sectional view of Fixture 316 with prismatic battery cell 302 placed therein along the A-A' line to shown inner components of arm 318 and arm 320.

As shown, inside arm 318, there may be two springs, namely spring 322 and spring 324. The number of springs are not limited to two and may be one or more than two depending on design parameters, constraints, and/or preferences. Each spring may be placed inside a casing to fix the respective one of spring 322 and spring 324 in place. Spring 322 and spring 324 may be coupled to adjuster 326 such that the force of spring 322 and spring 324 can move adjuster 326 horizontally, thus allowing adjuster 326 to simultaneously move roller(s) 328 horizontally. In other words, adjuster 326 may function to simultaneously move all roller(s) 328 synchronously.

Arm 318 also includes a number of roller(s) 328. For ease of illustration, FIG. 3D shows six roller(s) 328 inside arm 318 but only one such roller is numbered. The number of roller(s) 328 are not limited to that shown in FIG. 3D and may be more or less.

Arm 320 also includes a number of roller(s) 330. For ease of illustration, FIG. 3D shows six roller(s) 330 inside arm 318 but only one such roller is numbered. The number of roller(s) 330 are not limited to that shown in FIG. 3D and may be more or less. In some examples, the number of roller(s) 328 and roller(s) 330 may be the same. In another example, the number of roller(s) 328 and roller(s) 330 may be different.

Given that roller(s) 328 are driven by spring 322 and/or spring 324, roller(s) 328 may be referred to as spring-loaded rollers while roller(s) 330 are fixed in position and hence may be referred to as fixed rollers.

By having spring-loaded roller(s) 328 on one side (inside arm 318) of fixture 316, as prismatic battery cell 302 is placed inside opening of fixture 316, one side of prismatic battery cell 302 is positioned against roller(s) 330 and spring 322 and spring 324 may move roller(s) 328 to adjust for/accommodate for length of prismatic battery cell 302. Once placed inside the opening, spring 322 and spring 324 may expand to move roller(s) 328 to be in contact with the side of prismatic battery cell 302 and hence ensure that prismatic battery cell 302 is secured in place (with no room to wobble) for performing acoustic measurement(s) across prismatic battery cell 302.

Cross section view of FIG. 3D also reveals how different components of Fixture 316 may be coupled to one another (e.g., pieces of bottom portion 310 may be fastened using screw(s) 332.

Figure 4A:
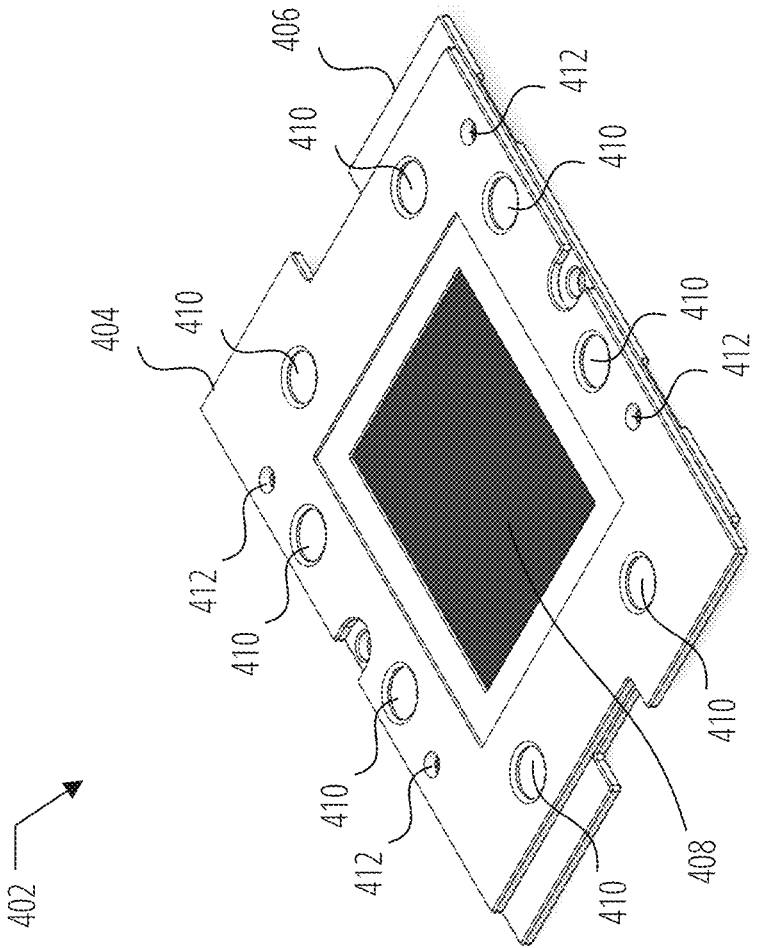
FIG. 4A illustrates an example of computer-generated rendering of a fixturing mechanism for placing a pouch cell in an ultrasonic test system according to some aspects of the present disclosure.

FIG. 4A illustrates an example of computer-generated rendering of a fixturing mechanism for placing a pouch cell in an ultrasonic test system according to some aspects of the present disclosure. Fixture 402 may include upper side 404 and lower side 406. Upper side 404 and lower side 406 may be connected (e.g., via a hinge (not shown)) so that Fixture 402 may be opened and closed. Once opened, a pouch cell (to be acoustically measured) may be placed in between upper side 404 and lower side 406 to be exposed via opening 408. In this manner both sides of a pouch cell can be exposed to (in contact with) transmitting transducers and receiving transducers such as transmitting transducer Tx 104 and/or transmitting transducers Tx 202 and receiving transducer Rx 106 and receiving transducers Rx 204 of FIGS. 1 and 2.

Once closed, upper side 404 and lower side 406 may be secured together (hence securing pouch cell placed therein for acoustic inspection). For instance, upper side 404 and lower side 406 may be aligned using aligning pins 412 and may thereafter be secured together using magnet-based coupling mechanism 410. Mechanisms for aligning and securing upper side 404 and lower side 406 is not limited to that described here and may be achieved according to any other known or to be developed mechanism/process.

Figure 4B:
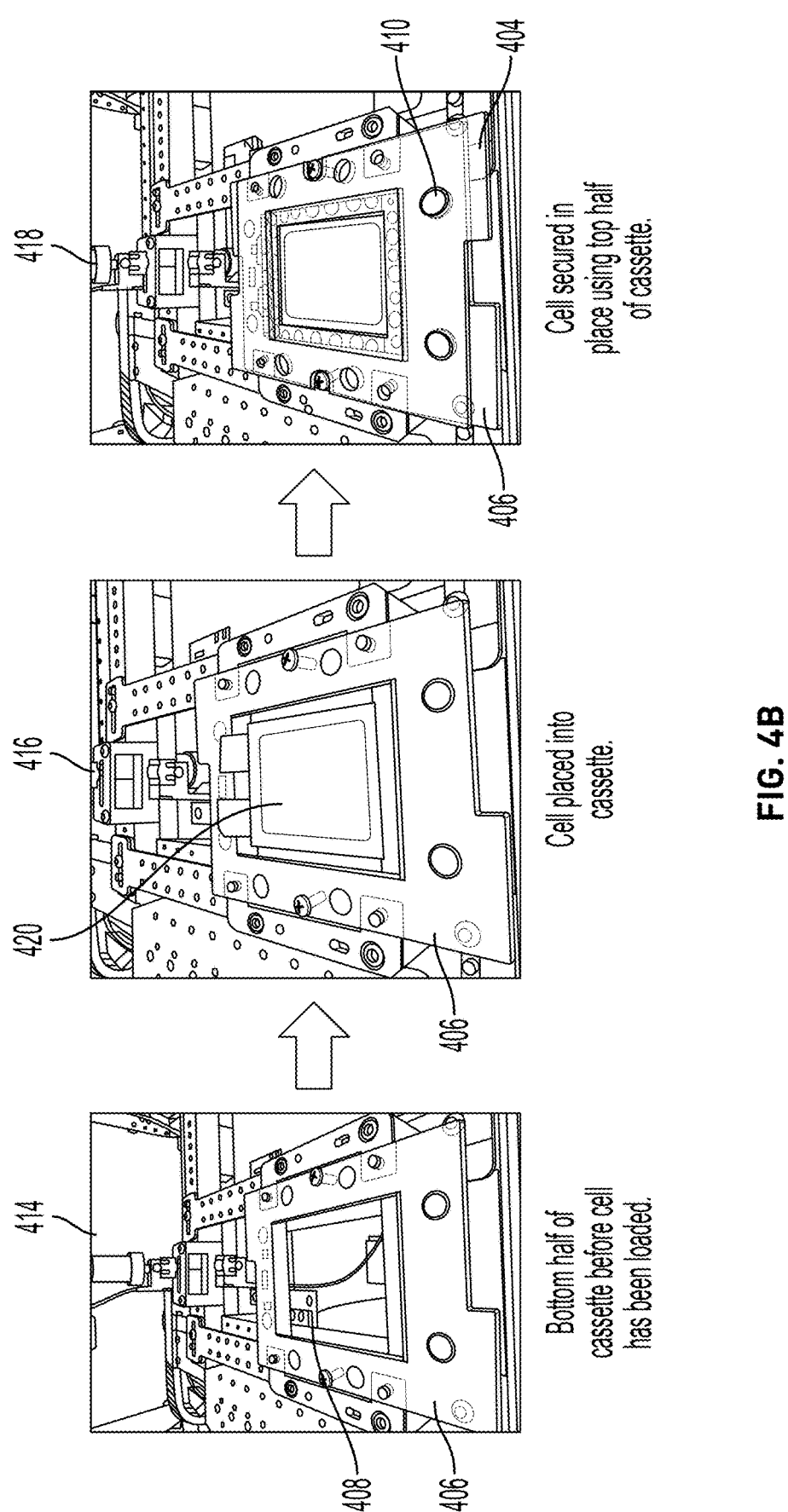
FIG. 4B illustrates images of an actual fixturing mechanism for pouch cells according to some aspects of the present disclosure.

FIG. 4B illustrates images of an actual fixturing mechanism for pouch cells according to some aspects of the present disclosure. While FIG. 4A illustrates a computer-generated rendering of Fixture 402, FIG. 4B provides three example pictures of actual Fixture 402 in three different stages. Stage 1 414 shows lower side 406 (Fixture 402 is open) for a pouch cell to be placed thereon (within opening 408).

Stage 2 416 shows that pouch cell 420 is placed on lower 406.

stage 3 418 shows that upper side 404 is placed on pouch cell 420 and lower side 406 (Fixture 402 is closed) and secured via magnet-based coupling mechanism 410.

Figure 4C:
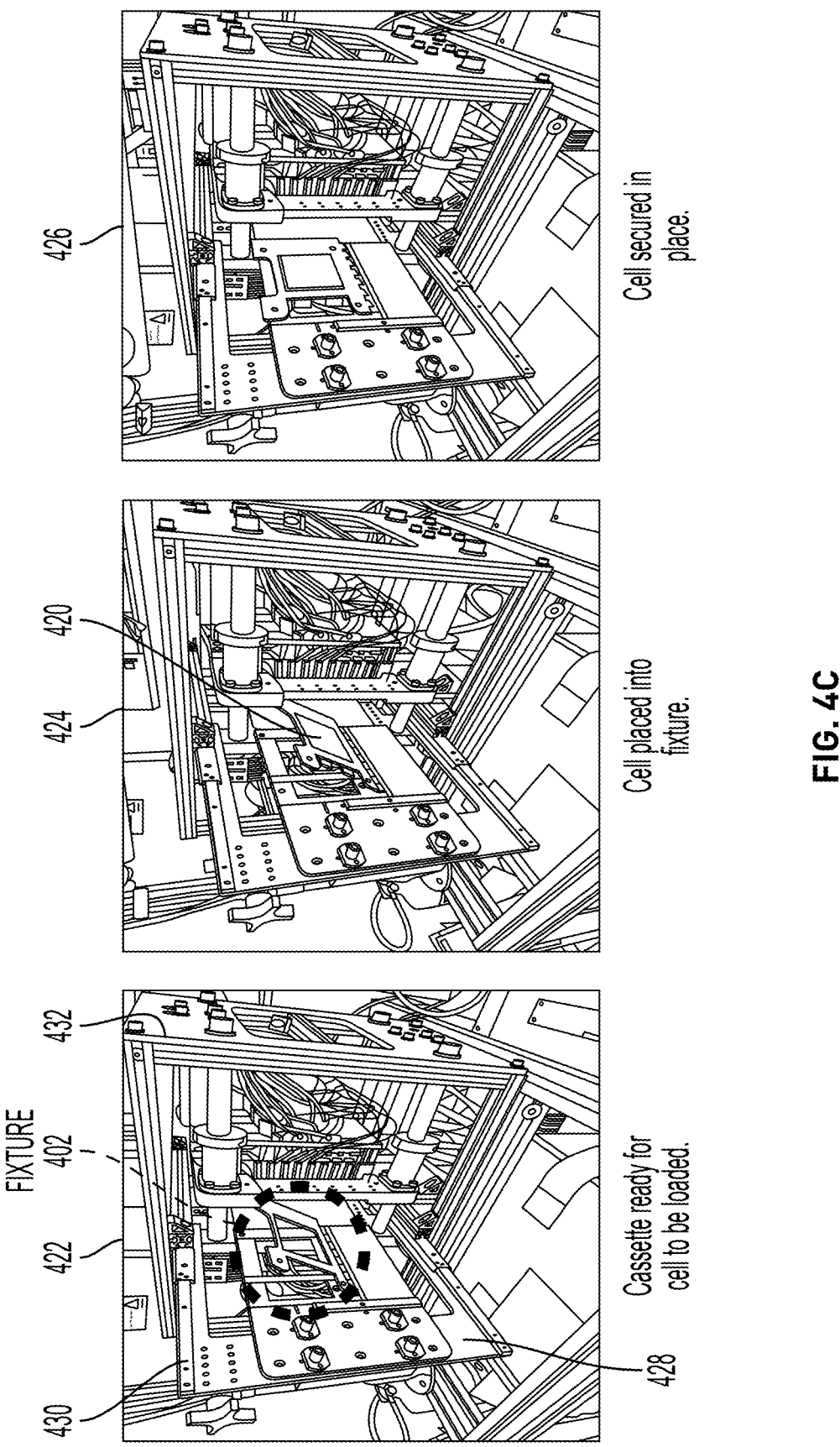
FIG. 4C illustrates images of an actual fixturing mechanism for pouch cells in operation within an ultrasonic test system according to some aspects of the present disclosure.

FIG. 4C illustrates images of an actual fixturing mechanism for pouch cells in operation within an ultrasonic test system according to some aspects of the present disclosure. FIG. 4 illustrates Fixture 402 in-use within an actual ultrasonic test system. Similar to FIG. 4B, three stages of Fixture 402 in-use are shown in FIG. 4C.

Stage 1 422 shows Fixture 402 in an open position and ready for a pouch cell to be loaded therein for acoustic inspection. As can be seen from Stage 1 422, Fixture 402 may be affixed to a plate 428. Plate 428 may itself be attached to moving mechanism 430 such that when a pouch cell is placed inside Fixture 402, pouch cell may be moved horizontally inside ultrasonic test system 432 to be acoustically inspected.

Stage 2 424 comes after stage 1 424 whereby pouch cell 420 is now placed inside Fixture 402 while Fixture 402 remains in an open position.

Stage 4 426 shows that after placement of pouch cell 420 inside Fixture 402, Fixture 402 is closed and ready to be inserted into ultrasonic test systems 432 using moving mechanism 430 for acoustic inspection.

Fixture 402 and/or any other components described with reference to FIGS. 4A-C may be made of any known or to be developed material suitable for inspection of battery cells. Furthermore, dimensions, design parameters, shape and/or type of Fixture 402 (and similarly Fixture 304 and/or Fixture 316) are not limited to those shown in FIGS. 3A-D and FIGS. 4A-C and can include any other dimension, parameter, shape, and/or can be made of other material suitable for carrying acoustic inspection of battery cells.

Furthermore, similar to example Fixtures described with reference to FIGS. 3A-D, pouch cells such as pouch cell 420 may be placed inside Fixture 402 using an automated and mechanical system. Alternatively, pouch cells may be manually placed inside Fixture 402.

Figure 5:
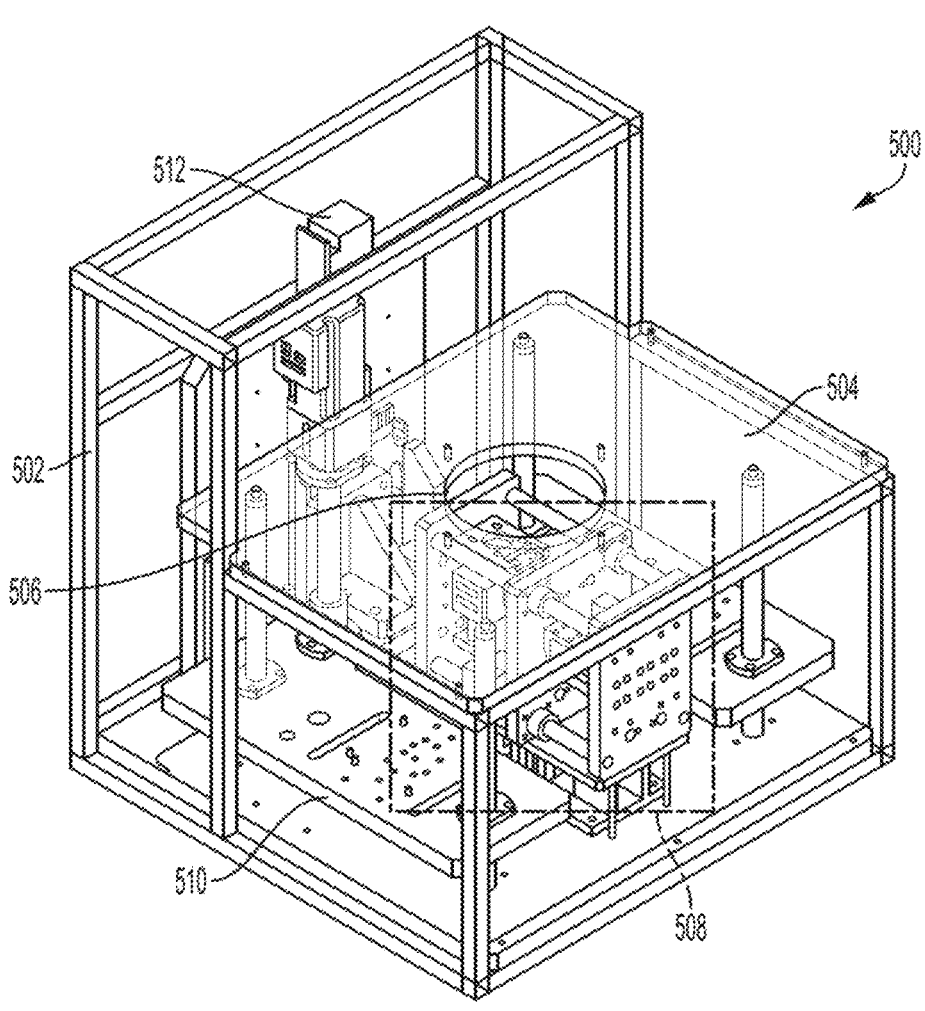
FIG. 5 illustrates an example ultrasonic test system for acoustic inspection of cylindrical battery cells according to some aspects of the present disclosure.

FIG. 5 illustrates an example ultrasonic test system for acoustic inspection of cylindrical battery cells according to some aspects of the present disclosure.

Example system 500 for inspection of cylindrical battery cells can include a casing 502 made out of any known or to be developed material. A glass top 504 may cover a portion of system 500 and include an opening 506 for receiving a cylindrical battery cell to be acoustically inspected. A holding mechanism 508 may be used for holding and/or rotating cylindrical battery cell to be inspected. Examples of holding mechanism 508 will be further described below with reference to FIGS. 6 and 7. Additionally, system 500 may include a stage 510 for mounting and installing transducers for multiple ways of inspecting cylindrical acoustic cells. FIG. 5 further illustrates an example z-translation motor 512. Motor 512 is configured to allow full rotation of a cylindrical battery cell for acoustic inspection with infinite resolution. For instance, motor 512 can control movement of multiple idlers to rotate a cylindrical battery cell.

Figure 6:
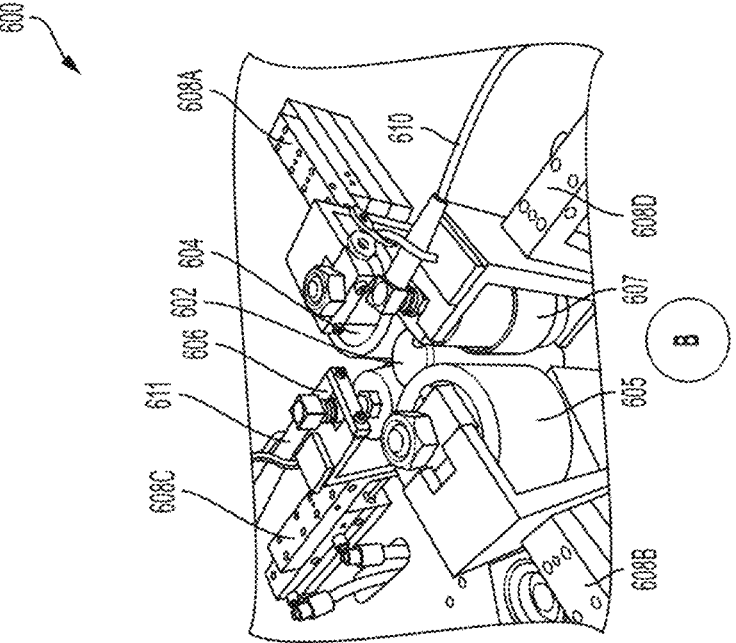
FIG. 6 illustrates an example of system of FIG. 5 in action for inspection of cylindrical battery cells according to some aspects of the present disclosure.
Figure 6:
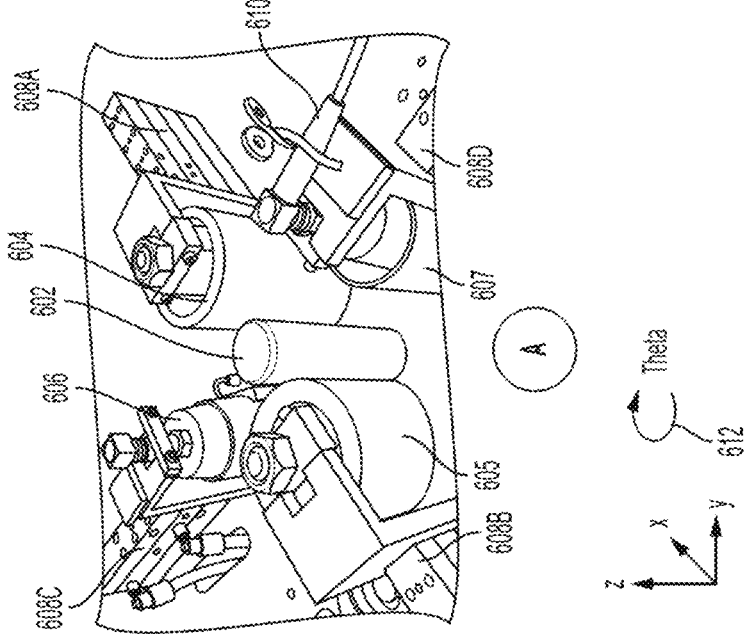

FIG. 6 illustrates an example of system of FIG. 5 in action for inspection of cylindrical battery cells according to some aspects of the present disclosure.

Example 600 includes two snapshots A and B of operation of system 500 of FIG. 5.

In snapshot A, cylindrical cell 602 is shown placed inside a holder (e.g., via opening 506 in FIG. 5) within system 500 (ultrasonic test system 500). Two example rollers (may also be referred to as idlers or grippers) 604 and 605 are shown that are connected to actuators (mechanical arms) 608A and 608B, respectively. In one example, actuators 608A and 608B may be controlled/operated by motor 512. Snapshot A also shows two roller (cylindrical) transducers 606 and 607, each being controlled/driven by actuators 608C and 608D, respectively. Each of transducers 606 and 607 may have a wired controller to a controller (e.g., processor 110 of FIG. 1) via cable 610 and 611. Cable 611 is shown in snapshot B. Each of transducers 606 and 607 may be an array of transducers packaged in a cylindrical unit to perform a single instance of transmission of acoustic signals and reception thereof at every angle of rotation. In this case, at any given angle, an entire vertical or axial slice of battery cell 602 (from top to bottom of battery cell 602) may be acoustically measured in that single instance of transmission and reception of acoustic signals.

In snapshot A, rollers 604 and 605 as well as transducers 606 and 607 are separated from cylindrical cell 602 indicating that either battery cell 602 has just been placed inside system 500 for inspection or that the inspection of battery cell 602 is completed and hence may be removed from system 500.

In snapshot B, rollers 604 and 605 as well as transducers 606 and 607 are in contact with cylindrical cell 602. While in contact, rollers 604 and 605 may rotate cylindrical cell 602 in theta direction (as indicated by 612). With each incremental rotation in theta-direction 612, transducers 606 and 607 perform an acoustic inspection of cylindrical cell 602 by transmitting and receiving acoustic signals therethrough. After each rotational measurement to measure a part or every theta position between 0° and 360°, the battery cell 602 may be translated (moved) in the axial (theta)- or z-direction by some incremental distance. Rotation of cylindrical cell 602 in theta-direction 612 continues until the entire axial surface of cylindrical cell 602 is acoustically scanned.

Figure 7:
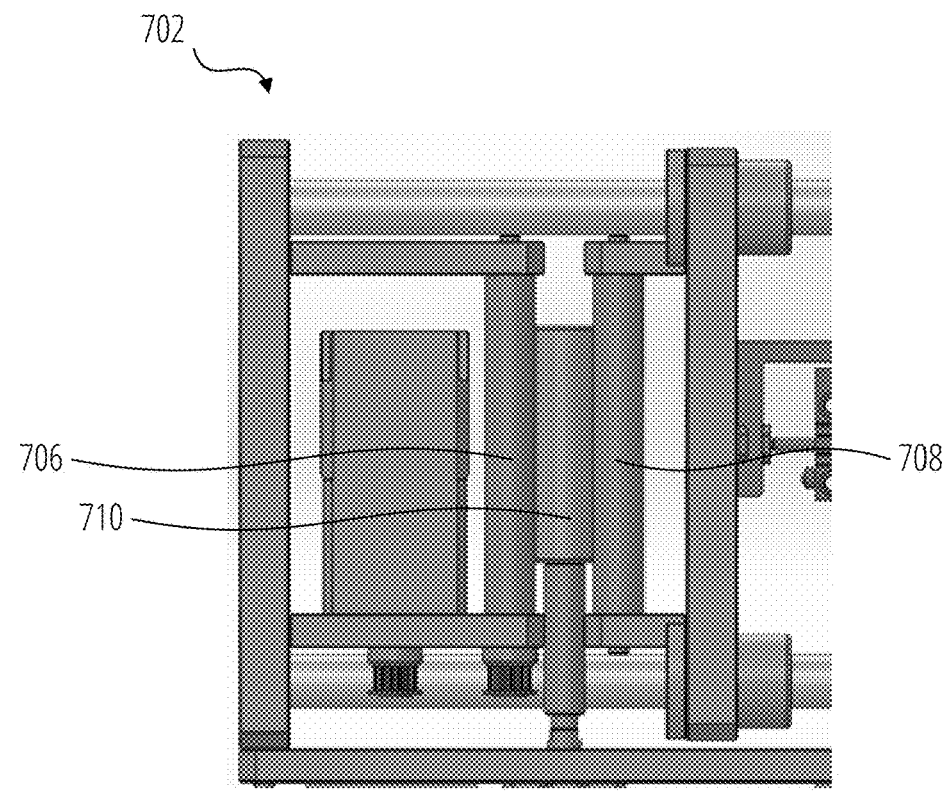
FIG. 7 illustrates top and front views of a fixturing mechanism for cylindrical cells used in systems of FIGS. 5 and 6 according to some aspects of the present disclosure.
Figure 7:
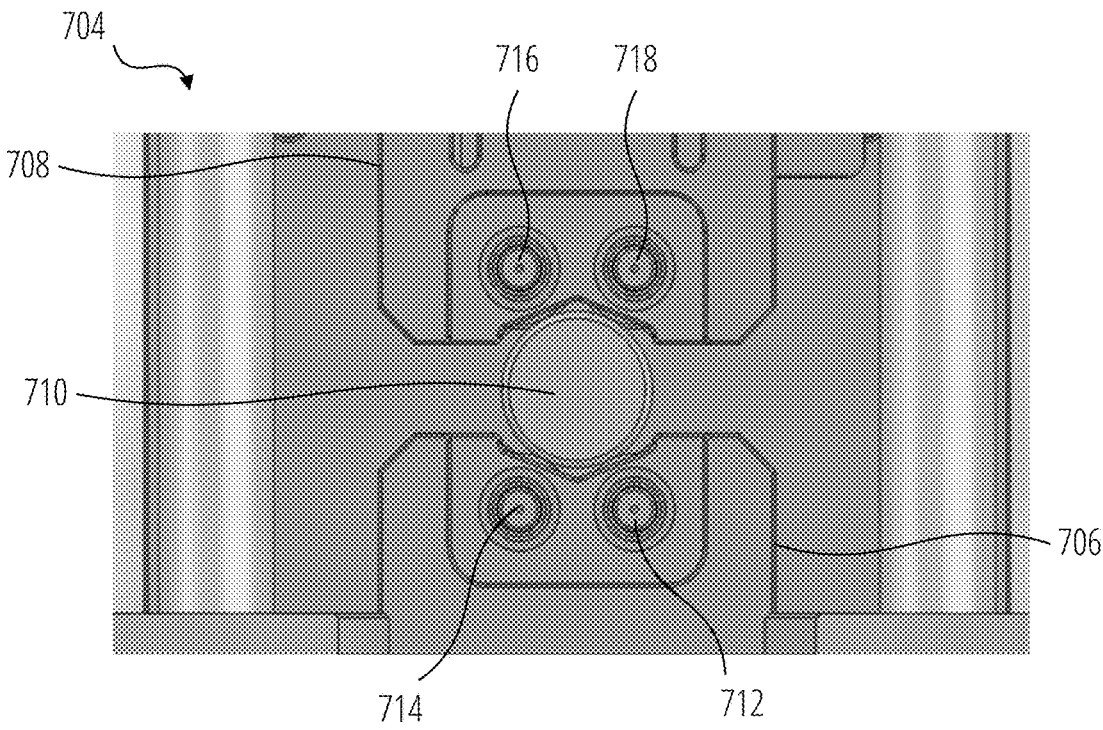

FIG. 7 illustrates top and front views of a fixturing mechanism for cylindrical cells used in systems of FIGS. 5 and 6 according to some aspects of the present disclosure. In example of FIG. 6, a fixturing mechanism is formed of rollers 604 and 605. In another example, each of rollers 604 and 605 may be formed of two cylindrical rollers. This alternative example is shown in FIG. 7. FIG. 7 provides a front view 702 and a top view 704 of a fixturing mechanism formed of structure 706 and structure 706 on each side of cylindrical cell 710 (which is the same as cylindrical cell 602) to be acoustically inspected in system 500.

Shown in top view 704, structure 706 can include two rollers, roller 712 and roller 714. Similarly, structure 708 can include two rollers, roller 716 and roller 718. The number of rollers in each structure is not limited to two but may be more or less. Structures 706 and 708 as well as rollers 712, 714, 716, and 718 may be made of any known or to be developed material suitable for carrying out acoustic inspection of cylindrical cells such as cylindrical cell 710. Furthermore, structures 706 and 708 as well as rollers 712, 714, 716, and 718 may have different shapes, sizes, and/or dimensions.

In one example, fixturing mechanism having structures 706 and 708 is such that one of rollers in structures 706 and 708 are driven (e.g., via pneumatic actuator(s), one or more motor(s)) to turn cylindrical cell 710 when structures 706 and 708 come into contact with cylindrical cell 710 (e.g., as discussed with reference to FIG. 6). For instance, roller 716 may be driven (e.g., using pneumatic actuator(s), one or more motor(s)). As roller 716 is driven to rotate cylindrical cell 710, other rollers (e.g., rollers 712, 714, and 716, which are not driven by any actuator) also rotate in sync with roller 716 to rotate cylindrical cell 710 to be acoustically inspected by transducers 606 and 607, as described with reference to FIG. 6.

Figure 8:
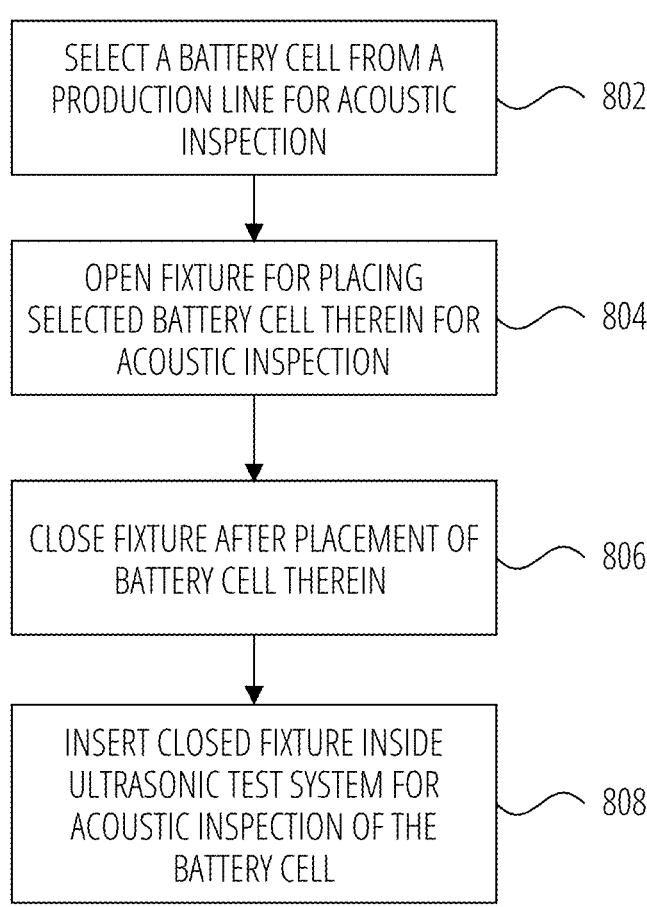
FIG. 8 is a flowchart of an example method of placing battery cells inside a fixturing mechanism according to some aspects of the present disclosure.

FIG. 8 is a flowchart of an example method of placing battery cells inside a fixturing mechanism according to some aspects of the present disclosure. Steps of FIG. 6 may be implemented by processor 110 of FIGS. 1 and 2. As may be evident to those having ordinary skill in the art, processor 110 may execute computer-readable instructions, such that processor 110 can send commands to one or more components of ultrasonic test system to carry out the steps described below.

At block 802, processor 110 may send a command to an electronically controlled arm (movable arm) of an ultrasonic test system (e.g., ultrasonic test system 432) to select a battery cell from a production line in a battery manufacturing facility for acoustic inspection (acoustic measurements). In one example, an ultrasonic test system may be installed on one or more production lines of the battery manufacturing facility. The type of the ultrasonic test system installed on each line may vary depending on the type of battery cells to be acoustically measured. For instance, ultrasonic test system 432 may be installed on a production line that produces pouch cells while ultrasonic test system 500 may be installed on a production line that produces cylindrical cells.

At block 804, processor 110 may send a command to open Fixture within ultrasonic test system for placement of a selected battery cell inside the Fixture (e.g., as described with reference to FIGS. 3A-D and FIGS. 4A-C) for acoustic inspection. In example of a cylindrical cell, opening a Fixture may entail moving transducers 606 and 607 as well as rollers 604 and 605 (or structures 706 and 708 of FIG. 7) into an open position for cylindrical cell 710 to be placed in the middle thereof, as described with reference to FIGS. 6 and 7 (e.g., position A in FIG. 6).

At block 806, processor 110 may send a command to close the Fixture once the selected battery cell is placed therein (e.g., as described with reference to FIGS. 3A-D and FIGS. 4A-C) for acoustic inspection. In example of a cylindrical cell, closing a Fixture may entail moving transducers 606 and 607 as well as rollers 604 and 605 (or structures 706 and 708 of FIG. 7) to come into contact with cylindrical cell 710 (e.g., position B in FIG. 6).

At block 808, processor 110 may send a command to place the closed Fixture (with battery cell therein) inside ultrasonic test system for acoustic inspection. For instance, this may be performed by moving moving mechanism 430 into ultrasonic test systems 432 as shown in FIG. 4C, by closing transducers 606/607 and rollers 604/605 of FIG. 6 (or structures 706 and 708 of FIG. 7), etc.

Example embodiments of various Fixtures for acoustic inspection of different types of battery cells (e.g., prismatic cells, pouch cells, cylindrical cells, etc.)

Figure 9:
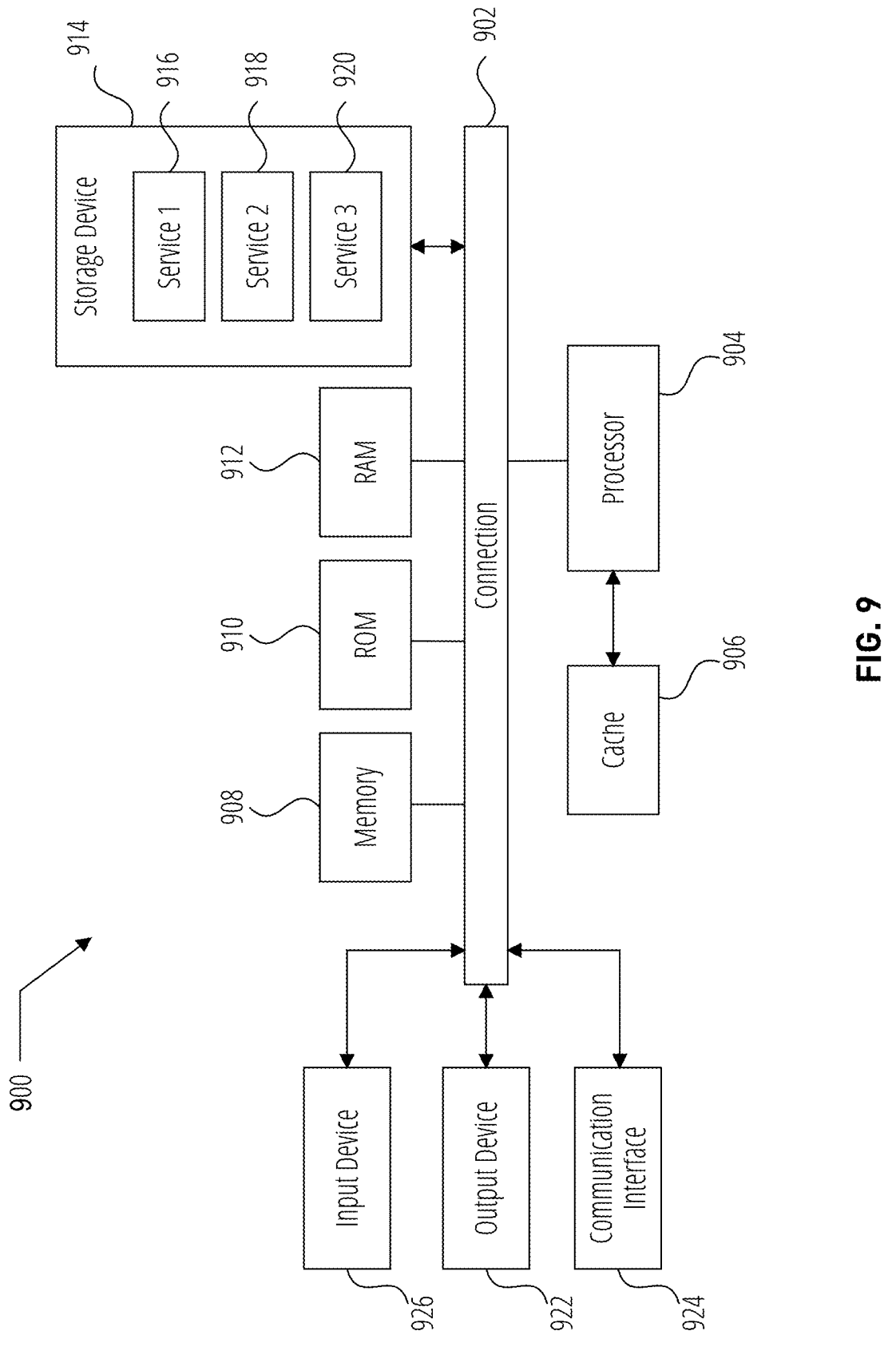
FIG. 9 shows an example computing system which can be, for example any computing device that can implement components of the system according to some aspects of the present disclsoure.

FIG. 9 shows an example computing system which can be, for example any computing device that can implement components of the system according to some aspects of the present disclsoure. FIG. 9 shows an example of computing system 900, which can be, for example, ultrasonic pulser/receiver 108, processor 110, a controller for automating loading of cells into example Fixtures described above with reference to FIGS. 3-8, etc.) In particular, FIG. 9 illustrates an example of computing system 900, which can be for example any computing device making up internal computing system, a remote computing system, or any component thereof in which the components of the system are in communication with each other using connection 902. Connection 902 can be a physical connection using a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 that uses connection 902 to couple various system components including system memory 908, such as read-only memory (ROM) 910 and random access memory (RAM) 912 to processor 904. Computing system 900 can include a cache of high-speed memory (cache 906) connected directly with, in close proximity to, or integrated as part of processor 904.

Processor 90404 can include any general purpose processor and a hardware service or software service, such as service 1 916, service 2 918, and service 3 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 92222, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Storage device 914 can include software services, servers, services, etc., that when the code that defines such software is executed by processor 90404, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. An apparatus for holding a battery cell for acoustic inspection, the apparatus comprising:
   a first piece coupled to a second piece, wherein the first piece is configured to open relative to the second piece for placing the battery cell between the first piece and the second piece for acoustic inspection such that a first side of the battery cell makes contact with the first piece and a second side of the battery cell makes contact with the second piece; and
   an opening formed in between the first piece and the second piece that provides exposure of third side and fourth side of the battery cell for the acoustic inspection after closing the first piece.

2. The apparatus of claim 1, wherein the battery cell is a pouch cell.

3. The apparatus of claim 1, wherein the apparatus is inserted into an ultrasonic test system for the acoustic inspection.

4. The apparatus of claim 3, wherein the apparatus is attached to a moving mechanism for placement within the ultrasonic test system.

5. The apparatus of claim 1, wherein the first piece and the second piece are coupled together using at least one aligning pin and at least one magnet-based coupling mechanism.

6. An apparatus comprising:
   a first side;
   a second side; and
   a bottom portion connecting the first side and the second side, wherein a U-shaped opening is formed between the first side, the bottom portion and the second side for placement of a battery cell therein for acoustic inspection, wherein a first surface of the battery cell makes contact with the first side and a second surface of the battery cell makes contact with the second side while the acoustic inspection is performed with reference to a third surface and a fourth surface of the battery cell.

7. The apparatus of claim 6, wherein the battery cell is a Prismatic Battery Cell.

8. The apparatus of claim 6, wherein the first side and the second side are movable to accommodate battery cells of different lengths to be placed within the U-shaped opening.

9. The apparatus of claim 8, wherein the first side and the second side are controlled to move horizontally for accommodating the battery cells of different lengths.

10. The apparatus of claim 9, wherein the first side and second side are independently controlled via separate actuators.

11. The apparatus of claim 6, wherein the first side is spring-loaded and the second side is fixed.

12. The apparatus of claim 11, wherein the first side is configured to move horizontally to adjust side of the U-shaped opening for receiving the battery cell therein.

13. The apparatus of claim 6, wherein each of the first side and the second side include one or more rollers configured to facilitate sliding the battery cell to fit within the U-shaped opening.

14. An apparatus comprising:

a first structure; and a second structure opposite the first structure, wherein a battery cell is placed in between the first structure and the second structure to be rotated by the first structure and the second structure for acoustic inspection, wherein different portions of a surface of the battery cell are subject to the acoustic inspection than portions of the surface in contact with the first structure and the second structure.

15. The apparatus of claim 14, wherein the battery cell is a cylindrical battery cell.

16. The apparatus of claim 14, wherein each of the first structure and the second structure is formed of a single cylindrical roller configured to spin for rotating the battery cell for the acoustic inspection.

17. The apparatus of claim 14, wherein each of the first structure and the second structure comprises at least two rollers.

18. The apparatus of claim 17, wherein one of the at least two rollers in one of the first structure or the second structure is controlled via an actuator for rotating the battery cell.

19. The apparatus of claim 18, wherein remaining ones of the at least two rollers in the first structure and the second structure are configured to rotate as a result of the battery cell rotating by the one of the at least two rollers.

20. The apparatus of claim 18, wherein the actuator is a pneumatic actuator.

* * * * *